Figure 1:
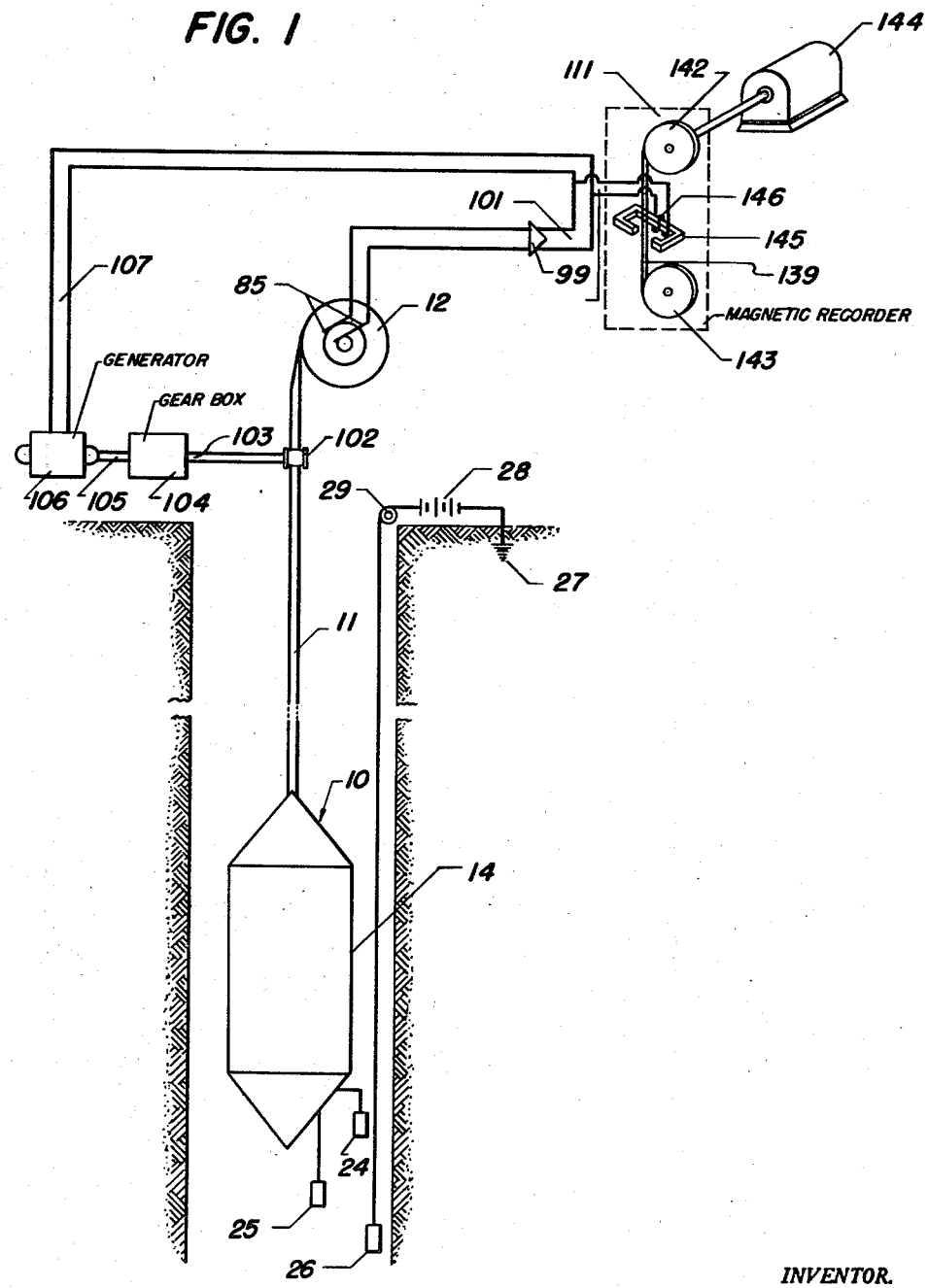

Feb. 27, 1951 J. NEUFELD 2,543,532
MULTIPLEX WELL LOGGING SYSTEM
Filed Aug. 6, 1948 3 Sheets-Sheet 3

INVENTOR.
JACOB NEUFELD
BY James Y. Cleveland
ATTORNEY

Patented Feb. 27, 1951

2,543,532

UNITED STATES PATENT OFFICE 2,543,532

MULTIPLEX WELL LOGGING SYSTEM

Jacob Neufeld, Oak Ridge, Tenn., assignor to Well Surveys, Incorporated, a corporation of Delaware Application August 6, 1948, Serial No. 42,843

2 Claims. (Cl. 346—33)

This invention relates in general to methods of geophysical exploration and more especially is concerned with improvements in methods of well logging such as are performed in connection with the drilling of oil or natural gas wells and the like, wherein sensing instrument is moved within a well bore to provide a graphic record, related to depth, of varying characteristics of subsurface geological strata traversed by the well bore.

To a larger measure, each of the several methods of well logging now commercially practiced possesses its own peculiar and unique advantages, however, the state of this art is such that many commercial organizations engaged in well logging work are unwilling or deem it inadvisable to rely solely upon logs made according to but a single method of well surveying, but prefer instead to log each well in accordance with several widely different methods, thus securing a plurality of parameters which when correlated with each other and with measurements of depth yield a more complete and more readily understandable indication of the true geological character of the subsurface formations than could be obtained by practice of only one method of logging. It has, for instance, been found desirable upon certain occasions, to supplement a log based upon measurements of natural radioactivity with a log based upon measurements of electrical conductivity.

This invention is particularly directed to recording the desired information in a "phonographic" or reproducible form and to provide a method for simultaneously recording quantities that are directly related one to another. Some of these quantities represent the characteristic of the formation to be determined and other quantities represent the depth at which said characteristics are determined. A suitable reproducer is provided for translating the phonographic impressions of these quantities into suitable electrical currents which are subsequently utilized to provide compound graphical indications commonly designated as "well logs," each of said indications representing in two coordinates the variation of the measured characteristic of the geological formation traversed by the drill hole with respect to the depths at which the measurement was performed.

In the embodiment to be described, a phonographic recording and reproducing apparatus of the telegraphone type is employed. As is well known in telegraphones, the signals are recorded by varying the magnetic condition of a moving magnetic body, and are reproduced by causing such a magnetized body to vary the magnetic induction in a suitable translating device.

The invention will be more readily understood from the following description taken in connection with the accompanying drawing, forming a part thereof, in which:

Fig. 1 represents schematically a portion of the well logging instrument lowered in the drill hole.

Figure 2:
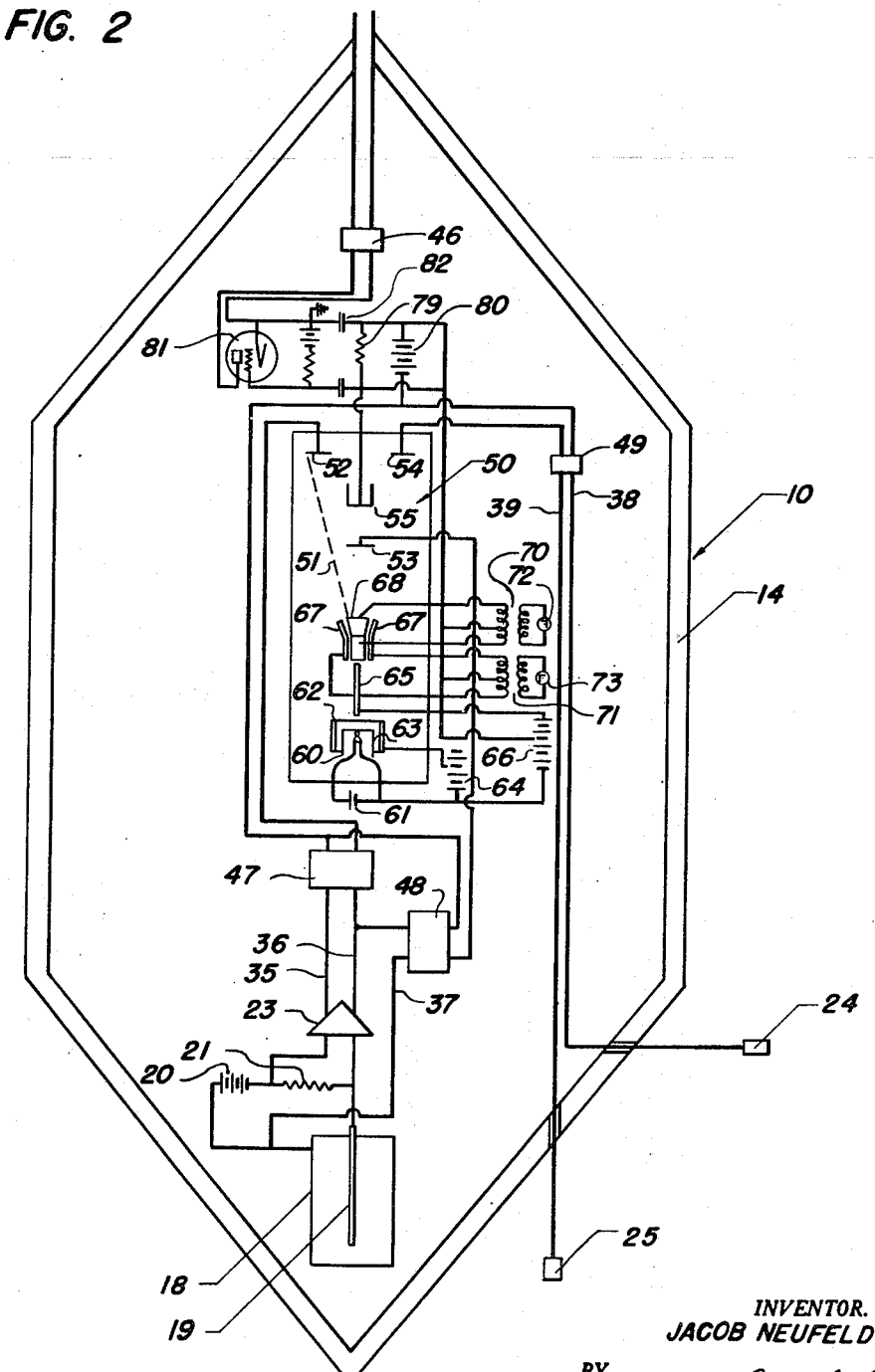

Fig. 2 schematically illustrates improved apparatus embodied in the present improved system to pick up and produce a composite record of a plurality of well logs resulting from a series of simultaneous measurements in a drill hole.

Figure 3:
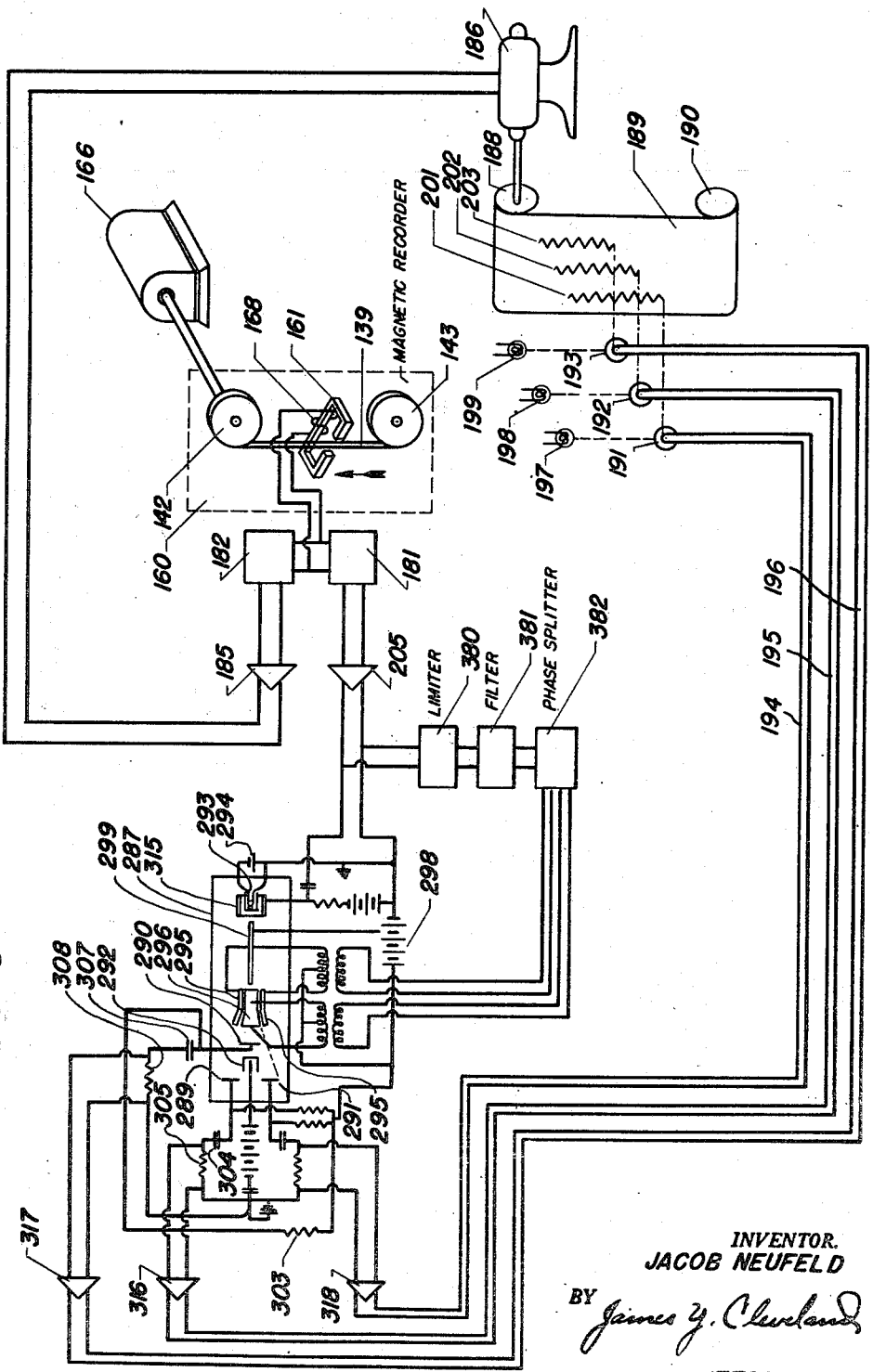

Fig. 3 illustrates improved apparatus embodied in the system to reproduce and resolve the composite signal back into its component parts and to pictorially record the signals in the form of individual logs.

Referring now more particularly to Fig. 1 and Fig. 2 a well bore is illustrated therein extending through a plurality of different subterranean strata and differing in geological character as will hereinafter be discussed. A prospecting instrument, generally designated by the reference character 10 is suspended within the well bore by means of a cable 11 which passes over a measuring wheel 12 and is wound upon a winch drum 13. The prospecting instrument 10 comprises a casing 14 fabricated from material possessing strength sufficient to resist high pressures and other conditions encountered in deep wells. In the casing 14 there is provided a radioactivity sensing unit, said unit comprising a cylindrical electrode 18 mounted in spaced relationship concentric to a wire electrode 19 and the space between the electrodes being occupied by a suitable inert gas such as argon under a relatively high pressure. It is to be understood that the radioactivity sensing unit is mounted within the casing in a manner such that natural radioactivity or artificially produced radiations from surrounding geological formations can cause ionization of the gas and passage of electrical current between electrodes. The electrodes 18 and 19 are connected in series through a battery or equivalent electrical energy source 20 and a resistor 21. In this circuit, the voltage drop across the resistor 21 is proportional to the current flowing in the ionization chamber which in turn is proportional to the intensity of the radiations from the surrounding geological formations. As shown in Fig. 2, the voltage drop across the resistor 21 is amplified in the amplifier 23.

A second sensing unit, useful in securing indications of specific resistivity of nearby formations will now be described. This unit comprises a pair of sensing electrodes 24 and 25, spaced with respect to each other and mounted externally of portions of the casing 10. An electropotential difference is established between the electrodes 24 and 25 by means of a first reference electrode 27, preferably located within the well bore below the geological strata being investigated, and a second reference electrode 27, grounded near the mouth of the well bore. The reference electrodes are maintained differentially electrically charged by means of a battery or other suitable power source 28 connected thereto. Means for raising and lowering the reference electrode within the well bore, such as a drum 29, is provided for facilitating alteration of the spaced relationship of the reference electrodes and also for assisting in the examination of strata occurring at different levels. This apparatus for measuring differences of potentials, indicative of the characteristics of surrounding geological strata within a well bore, is similar in principle of operation to the apparatus described in the Schlumberger Patent No. 1,819,923 granted August 18, 1931.

The present invention has a specific purpose to individually examine and to produce automatically a record of the following three signals:

(a) Voltage derived from the amplifier 23 and applied across leads 35 and 36, said voltage representing the radioactivity of the formations adjoining the drill hole.

(b) Voltage across the terminals of the battery 20, said voltage being applied across the leads 35 and 37.

(c) Voltage across the sensing electrodes 24 and 25, said voltage representing the resistivity of the adjoining formations.

The operation of the present system comprises broadly speaking, simultaneously impressing said three signals through three separate channels to low pass filters 47, 48, and 49 and connecting the outputs of said filters to an electronic commutator 50. The three channels are designated by leads 35, 36; 35, 37, 38, and 39 respectively. The filters 47, 48, and 49 have a cut off frequency in the neighborhood of 40 cycles per second.

The electric commutator 50 comprises means for producing a concentrated electron beam 51. The beam 51 impinges in succession upon the targets 52, 53, and 54, and a collecting electrode 55. Each of the targets has its surface upon which the electron beam impinges constructed or treated to render it capable of copious and efficient secondary electron emission. The cathode heater, which may be a filament 60 is supplied from a source such as a battery 61. Electrode 62 is maintained at a negative potential with respect to the cathode 63 as by a battery 64. The first anode 65 is maintained strongly positive, for example of the order of 600 volts, with respect to the cathode as by a battery 66. The sweep or deflector plates 67 and 68 are connected to an intermediate positive point on battery 66 through the secondary windings of transformers 70 and 71. The positive potential applied to plates 67 and 68 may be of the order of 300 volts.

The sweep or deflector plates 67 and 68 are energized at a suitable frequency, for example at a frequency of a few thousand cycles per second by oscillators 72 and 73 respectively through the transformers 70 and 71. The oscillators are 90 degrees out of phase so that a rotating field is produced between the deflector or sweep plates.

Although two oscillators are shown, it will be understood, of course, that a single oscillator having a split output may be used. Also, although an electrostatic rotating field is utilized, it will be understood that a rotating magnetic field may be employed. In the latter case, the beam motion may be adjusted by rotating the external sweep coils about the axis of the device.

In operation the casing 14 containing the sensing instrument is moved within the well bore in the vicinity of the geological formations to be examined and three voltages representing the radioactivity, resistivity and the voltage of the battery 20 are derived from three separate channels and are simultaneously applied to the electronic commutator 50. The voltage representing the radioactivity is derived from the leads 35 and 36 and is applied to the target 52 and to the collecting electrode 55, through a suitable resistance 79 and a battery 80. Battery 80 maintains the collecting electrode at a positive potential with respect to each of the targets. This potential is preferably such that it alone would cause about one-half of the secondary electrons emitted by each target, when no signal is present on each target, to be drawn over to the collecting electrode 55 and operates at substantially the mid-point of the secondary current potential between targets and collector characteristics. The signal representing resistivity of the adjoining formations is derived from the leads 38 and 39 and applied to the target 54 and to the collecting electrode 55 through the resistor 79 and battery 80. Similarly, the signal representing the voltage of the battery 20 is derived from the leads 35 and 37 and is applied to the target 53 and to the collecting electrode 55 through the resistor 79 and battery 80.

The electrons emanating from the cathode 63 are concentrated into a beam focussed, as described heretofore, to a point which when the beam is rotated by the fields produced by the deflector or sweep plates, lies on the electron receiving surfaces of the targets 52, 53, and 54. As the beam revolves it impinges upon the targets repeatedly and in succession to cause the emission of secondary electrons therefrom which constitute currents flowing to the common collector electrode 55. The magnitude of the current from each of the targets will be dependent, of course, upon the potentials produced upon each target by the corresponding individual channel coupled thereto. The secondary electron currents from the targets flow in succession through the resistance 79 to cause corresponding variations in the voltage drop across that resistor and constitutes a multiplex signal.

The resistor 79 is connected across the input circuit of an amplifier 81, a suitable blocking condenser 82, being provided as shown. The output circuit of the amplifier is applied through a low pass filter 46 to the cable 11 and transmitted to the receiving equipment located at the top of the drill hole. The filter 46 has a cut-off frequency in the neighborhood of 300 cycles per second.

At the receiving end the multiplex signal is taken from the cable by means including slip rings 85 mounted upon the winch drum 13, and is amplified by means of an amplifier 99 and applied to the channel 101.

A suitable means is provided, such as a measuring reel 102, which is adjusted to roll on cable 11 in such a manner that the number of revolutions of the reel corresponds to the amount of cable which has passed up or down in the drill hole. The reel is mounted on a shaft 103 and the motion of the shaft 103 is transmitted through a gear box 104 to another shaft 105 which turns a generator 106. The generator 106 is adapted to produce across its output channel 107 a current having a frequency proportional to the speed of rotation of the shaft 103. Under normal operating conditions, the linear speed of the cable 11 may be assumed to be 3,600 feet per hour, then the output frequency of the generator 106 will be 500 cycles per second. Consequently each cycle derived from the generator, under the assumed conditions, represents 0.002 foot of the downward displacement of the cable 11.

Consider now two signals that are produced in the channels 101 and 107 respectively. The signal in the channel 101 is the multiplex signal representing the information to be conveyed and the signal in the channel 107 designated as "reference signal" represents the corresponding linear velocity of the exploring instrument. The reference signal is represented by a single frequency designated as $f_r$ and the multiplex signal occupies a band of frequencies, each of the components of said band being designated as $f_s$.

It has been found that at normal logging speed in order to provide all the necessary detailed information representing the measurements performed, a frequency band well below the frequency of 40 cycles per second is necessary. Consequently the cut-off filters 47, 48, and 49 inserted between the three respective information conveying channels and the commutator 50 do not eliminate any significant information that it is desired to record. Under the present conditions a frequency of about 80 cycles per second per channel for sampling and distributing is indicated to be adequate. If the filters 47, 48, and 49 were absent from the arrangement shown in Figure 1, then the frequencies in each channel that are above 40 cycles per second would beat with the distributor to produce frequencies of less than 40 cycles per second. In order to eliminate the spurious frequencies thus produced and thereby to obtain faithful transmission and reproduction of the original signals, each of the individual filters inserted in corresponding channels has been designed in accordance with known methods to have a cut-off frequency of about 40 cycles per second.

The multiplex signal transmitted over the cable 11 will comprise a series of impulses. For economical and practical reasons the frequency range of the multiplex signal transmitted through the cable 11 is terminated by means of filter 46 at a cut-off frequency, which may be designated as $f_{s_{max}}$. This may result in the spreading out of an impulse at one of the segments 52, 53 or 54 and overlapping thereof upon an impulse from the next adjoined segment with a consequent cross interference between the individual channels.

Such cross interference may be substantially eliminated, or at least held to amplitude levels not objectionable for faithful transmission if the cut-off frequency $f_{s_{max}}$ is not appreciably greater than $1/T$, where $T$ is the time interval between the centers of the impulses. Since there are three channels, each having a cut-off of 40 cycles per second, the upper frequency limit required for the filter 46 is determinable by the relation $f_{s_{max}} = 3.80 = 240$ cycles per second.

The values $f_r$ and $f_{s_{max}}$ are subject to fluctuation due to varying speed of the exploring instrument 10, i. e., due to the varying logging speed.

Although at normal well logging speed $f_r = 500$ cycles per second, it should be assumed that because of the fluctuations, the value of $f_r$ becomes larger and smaller than 500 cycles per second, but never gets below the value of 450 cycles per second. Similarly the band of frequencies comprising the components $f_s$ fluctuate in response to the variation in the well logging speed but is always contained within a range from zero to 300 cycles per second. Consequently $f_{s_{max}} < 300$.

Both the multiplex and the reference signals are transmitted through a common channel 110 and applied simultaneously to the magnetic recorder 111.

The magnetic recorder comprises a magnetic tape 139 that is driven as indicated by the arrow in proximity to the recording head 145. Two spools or reels 142 and 143 serve as support for the tape in a well known manner and are arranged to be driven by a motor 144. The magnetic record of the multiplex and the reference signals is made on the tape 139 by transverse magnetization induced by pole pieces contacting or nearly contacting either side of the tape directly opposite each other. The recording head consists of an electromagnet having an iron core 145 and a winding 146 wound around the core 145. The core 145 is provided with two pole pieces immediately adjacent one another. The tape 139 is made to pass through the air gap 148 between the pole pieces in such a manner that the plane of the tape is perpendicular to the line joining the pole pieces.

Let the speed of the tape 139 be $v$ cm. per second. Then the frequencies $f_s$ representing the significant signal will distribute themselves lengthwise with respect to the tape in such a manner that each cycle (i. e., each alternation per second) of the significant signal will be recorded lengthwise upon an element of the tape having length $v/f_s$ cm. Similarly each cycle of the reference signal will be recorded lengthwise upon an element of the tape having length $v/f_r$ cm.

As the tape becomes gradually wound upon the drum 142, the diameter of the drum 142 increases, and although the angular speed of rotation of the drum may be assumed constant, the linear speed of the tape increases as the winding progresses. In many other instances, the angular speed of the drum may not be maintained at a constant value and, consequently, a situation may frequently occur in which the linear speed $v$ cm. per second of the tape undergoes frequent and uncontrollable changes.

It has been stated in a preceding paragraph that one cycle of the reference signal occupies $v/f_r$ cm. of the tape and corresponds to 0.002 foot of the downward displacement of the exploring element. Similarly, one cycle of the multiplex signal occupies $v/f_s$ cm. of the tape. Consequently when the linear speed $v$ of the tape increases the frequencies of the linear distribution of the multiplex or of the reference signal decreases, and, therefore, the multiplex signal distributes itself sinusoidally upon the moving tape at linear frequencies that are modulated inversely by the speed of the tape. Linear frequency is used to designate the number of alternations of the signal that is recorded lengthwise upon a unit of length of the tape. If a signal having time frequency $f$, i. e., varying $f$ times per seconds, is considered the linear frequency of such a signal will be $f/v$ cycles per cm. Consequently the multiplex signal occupies a band of linear frequencies from zero to $300/v$ cycles per cm. and the significant signal is represented by a linear frequency that is always larger than $450/v$ cycles per cm.

The distance between any selected point of the tape 139 and the point corresponding to the beginning of the tape can be measured by two methods. The first method consists in determining the number of units of length, say centimeters, separating the two points and represents the total length of the tape from the initial point to the point under consideration. The second method consists in determining the number of linear cycles of the reference signal impressed upon the portion of the tape separating the initial point and the point under consideration. It is obvious that the linear cycles are not equal one to another in length; they correspond, however, to equal intervals of length, each of said intervals representing 1/500 of a foot of the downward displacement of the exploring element. Consequently, the second method identifies any selected point on the tape and the signal impressed at that point, not by its actual distance from the initial point on the tape in centimeters, but by the depth in the drill hole at which the impressed signal was obtained.

In Figure 3 there is shown an arrangement for reproducing the signal impressed upon the magnetic tape and translating this signal into three logs to provide a visual representation of the variation of the radioactivity and resistivity with respect to the depth of the strata encountered, as well as the variation of the voltage of the battery 20.

The magnetic tape 139 containing the impressions obtained by means of the arrangement of Figure 2 is now inserted into a magnetic reproducer 160 shown in Figure 3. The reproducer comprises the usual reproducing head 161 associated with the tape at a point between the two spools 142 and 143. In order to reproduce the signals impressed magnetically upon the tape 139, the tape has to be removed linearily through the reproducing head in the direction indicated by the arrow. This is accomplished by driving spool 142 by the motor 166 to wind the tape 139 thereon from spool 143. The tape 139 passes the reproducing head 161 as it moves from spool 143 to spool 142. The motor 166 has an approximately constant angular velocity that is substantially the same as the angular velocity of the motor 144 in Figure 1.

The reproducer head 161 is structurally similar to the recording head 145 of Figure 2. In particular, the reproducer head 161 consists of an electromagnet having an iron core and a winding 168 wound thereon. The core is provided with two pole pieces having the form of two relatively sharp edges that are disposed immediately adjacent to each other. The tape 139 is made to pass through the air gap 178 between the pole pieces in such a manner that the plane of the tape is perpendicular to a line joining the pole pieces.

In the manner shown, the pole pieces will each supply a magnetic path for the changing flux resulting from the passage of the magnetized tape and this flux links the associated coil 168 to generate a voltage in the coil. This voltage comprises both the multiplex signal and the reference signal. It has been assumed that the multiplex signal occupies a band of linear frequencies from zero cycles to $300/v$ cycles per cm. and that the reference signal has a linear frequency that is always larger than $450/v$ cycles per cm. of the length of the tape. Assume also, that at the instant under consideration the linear speed of the tape is in the neighborhood of $v$ cm./sec., i. e., it is substantially the same as the linear speed during a prior instant when the same portion of tape received magnetic impressions by means of the apparatus of Figure 2. Then one obtains across the output terminals of the coil 168 the multiplex signal occupying a band substantially between zero cycles to 300 cycles per second and the reference signal having the frequency of substantially above 450 cycles per second. In the actual practice, however, the speed of the tape during the reproduction is not equal to the speed of the tape during the recording. The departure between these two speeds is smaller, however, than known preassigned limits and for all practical purposes, it can be assumed that the multiplex signal reproduced across the output of the coil 168 is located within definite limits, such limits being zero cycles and 350 cycles per second. Similarly, the reference cycles reproduced across the output of the coil has a frequency that is always larger than 350 cycles per second.

The multiplex signal is separated from the reference signal by means of filters 181 and 182 in such a manner that the frequencies of the multiplex signal are transmitted through the filter 181, while the reference frequency signal is transmitted through the filter 182 and amplified in the amplifier 185. The output signal from amplifier 185 is used to energize the synchronous motor 186.

Motor 186 is adapted to turn a spool 188 to wind a light sensitive strip of paper 189 which is supplied from a spool 190. Three galvanometer elements 191, 192, and 193 are provided which are adapted to move in response to the three signals derived from channels 194, 195, and 196 respectively and to correspondingly modify the beams of light derived from the sources 197, 198, and 199 respectively, thus producing upon the paper strip 189 three graphical records 201, 202, and 203. The three signals derived from the channels 194, 195, and 196 are obtained from the output of the filter 181. After passing through the amplifier 205 they are applied to an electronic commutator 287. The commutator produces across the channels signals which represent respectively radioactivity, resistivity of the encountered formations and the voltage of the battery 20. Consequently the graphical records 201, 202, and 203 represent variations versus depth of the radioactivity, resistivity and of the voltage of the battery 20.

As shown in Figure 3, the electronic commutator 287 comprises means for producing a concentrated electron beam which impinges upon the targets 289, 290, and 291 and a collecting electrode 292. The cathode heater 293 is supplied from a battery 294 and the sweep or deflector plates 295, and 296 are maintained strongly positive with respect to the cathode 297 by means of the battery 298. The first anode 299 is connected to an intermediate positive point of this battery and is maintained approximately at one-half of the potential of the deflecting electrodes 295 and 296. The targets 289, 290, and 291 are connected to the cathode 297 through individual resistances 301, 302, and 303 and to the collector electrodes 292 through three individual series circuits. One of the circuits includes a condenser 304, resistance 305 and biasing battery 306. A second circuit includes a condenser 307, resistance 308, and the biasing battery. The third circuit includes a condenser 309, resistance 310 and the biasing battery. The bias upon the collector electrode caused by the battery 306 is such that the collector electrode draws substantially all the secondary electrons to it.

The multiplex signal derived from the amplifier 205 is applied between the cathode 297 and electrode 315 and modulates the rotating electron beam which impinges in succession and repeatedly upon the targets 289, 290, and 291. The secondary electron current from each target flows through the corresponding resistors 305, 308, and 310 and produces variation in the voltages across the output terminals of the resistors. The voltages are subsequently amplified in the amplifiers 316, 317, and 318 respectively, and transmitted through the channels 195, 196, and 194 respectively, to produce visual records 202, 203, and 201 which represent measurements of radioactivity, resistivity and the voltage of battery 20, respectively.

For the successful operation of the present system it is essential that the relationship between the rotation of the beam of the commutator 287 and the speed of the motor 166 be the same as the relationship between the rotation of the beam in the commutator 50 and the speed of the motor 144. In order to accomplish this one of the components of the multiplex signal is used as a synchronizing signal. The component used is that representing the voltage of the battery 20. It is apparent that this component is considerably larger in magnitude than the two remaining components which represent the resistivity and radioactivity respectively, and consequently can be differentiated from the remaining components by means of an amplitude limiter. As shown in Figure 3, the multiplex signal is applied to a limiter 380, which chops off the smaller components and transmits the battery voltage. It is apparent that the voltage transmitted by the limiter 380, appears recurrently across its output terminals at time intervals determined by the speed of rotation of the beam in the electronic commutator 50, and by the speed of the motor 166.

Consequently, there is obtained across the output terminals of the limiter 380 a periodic signal which is exactly synchronized with the interrupting sequence of the elecronic commutator 50. This periodic signal is transmitted through a filter 381 and a phase splitter 382, thus producing across the output terminals of the phase splitter two voltages displaced in phase by 90 degrees. The voltages are used for the energization of the deflection electrodes 295 and 296 of the electronic commutator 287.

As indicated above, the phase or time relationship between the separately collected signals representing various measurements in the drill hole are not altered or disturbed by compositely recording these signals upon the magnetizable tape 139. It is equally apparent that the signal separation and signal resolution is similarly carried out in the various separating channels of the reproducing apparatus shown in Figure 3 without altering the original phase relationship between the collected signals. More specifically, the signals respectively appearing at the output sides of the amplifiers 316, 317, and 318 in Figure 3 bear exactly the same phase relationship, one to the other, as obtained between the signals during the collection thereof by the measuring instruments contained in the housing 10.

I claim:
1. Apparatus useful in geophysical prospecting, comprising an exploring unit adapted to be lowered in a drill hole including a plurality of sensing instruments directly and individually responsive to different characteristics of geological formations adjoining said drill hole for individually producing electrical currents representing said characteristics, and an electrical cable for transmitting simultaneously all of said currents to the surface of the earth, a plurality of switches interconnecting said cable with said sensing elements, respectively, a controlling means for cyclically energizing said switches at mutually exclusive time intervals whereby each of said sensing elements transmits through said cable a train of elementary signals, at mutually exclusive time intervals, means operated in a definite time relationship with said controlling means for producing synchronizing signals and for transmitting said synchroniizng signals through said cable, a recorder positioned at the earth's surface and connected to said cable for producing a phonographic record of said elementary and synchronizing signals, a reproducer provided with two channels and adapted to be operated in conjunction with said record for reproducing said elementary signals across the first of said channels and said synchronizing signals across the second channel, a plurality of switching elements and a plurality of indicators said switching elements being individually adapted to connect said first channel to each of said indicators, means for deriving from said second channel said synchronizing signals and for utilizing said signals to cyclically energize said switching elements at mutually exclusive time intervals thereby individually transmitting said separate trains of signals to said indicators.

2. Apparatus useful in geophysical prospecting, comprising an exploring unit adapted to be lowered in a drill hole including a plurality of sensing instruments directly and individually responsive to different characteristics of geophysical formations adjoining said drill hole for individually producing electrical currents representing said characteristics, an electrical cable for transmitting simultaneously all of said current to the surface of the earth, a plurality of switches interconnecting said cable with said sensing elements respectively, a controlling means for cyclically energizing said switches at mutually exclusive time intervals whereby each of said sensing elements transmits through said cable a train of elementary signals at mutually exclusive time intervals, means operated in a definite time relationship with said controlling means for producing synchronizing signals and for transmitting said synchronizing through said cable, means for producing signals representing depths to which the exploring unit is lowered, a recorder positioned at the surface of the earth and connected to said last means and to said cable for producing a phonographic record of said depth representing, elementary and synchronizing signals, a reproducer provided with three channels and adapted to be operated in conjunction with said record for reproducing said elementary signals across the first of said channels, said synchronizing signals across the second channel, and said depths representing signals across the third channel, a plurality of switching elements and a plurality of indicators, said switching elements being individually adapted to connect said first channel to each of said indicators, means for deriving from said second channel said synchronizing signals and for utilizing said signals to cyclically energize said switching elements at mutually exclusive time intervals thereby individually transmitting said separate trains of signals to said indicators, and means connected to said third channel and responsive to said depth representing signals for controlling the operation of said indicators.

JACOB NEUFELD.

REFERENCES CITED

The following references are of record in the file of this patent:

UNITED STATES PATENTS

| Number | Name | Date |
|---|---|---|
| 2,378,388 | Begun | June 19, 1945 |
| 2,378,383 | Arndt, Jr. | June 19, 1945 |
| 2,436,503 | Cleveland | Feb. 24, 1948 |
| 2,441,065 | Green | May 4, 1948 |